Jan. 3, 1967     U. WEBER     3,296,562
ELECTROMECHANICAL FILTER
Filed Sept. 21, 1962     2 Sheets-Sheet 1

INVENTOR
Ulrich Weber

BY Spencer & Kaye
ATTORNEYS

Jan. 3, 1967     U. WEBER     3,296,562

ELECTROMECHANICAL FILTER

Filed Sept. 21, 1962     2 Sheets-Sheet 2

INVENTOR
Ulrich Weber

BY *Spencer & Kaye*
ATTORNEYS

United States Patent Office 3,296,562
Patented Jan. 3, 1967

3,296,562
ELECTROMECHANICAL FILTER
Ulrich Weber, Ulm (Danube), Germany, assignor to Telefunken Patentverwertungs-G.m.b.H., Ulm (Danube), Germany
Filed Sept. 21, 1962, Ser. No. 225,203
17 Claims. (Cl. 333—71)

The present invention relates to a mechanical frequency filter composed of resonators and coupling wires and surrounded by a frame, and to methods of making such filters.

There exist filters which comprise a plurality of resonator elements which are arranged with their axes substantially parallel to each other, which have both ends freely oscillatable, which are susceptible to being oscillated in longitudinal or torsional modes, which have a length equal to a half wave length or a multiple thereof, and which are coupled to each other by means of coupling elements which can be excited to swing in bending or longitudinal modes.

It is an object of the present invention to provide a mounting for this type of filter arrangement, particularly when the filter is to be made very small, which mounting also offers good protection against external mechanical influences, and, with this basic object in view, the present invention resides in a filter whose individual resonators and electro-mechanical transducers together with their coupling means, such as wires, are surrounded by a frame.

The resonators and transducers, which are preferably arranged with their axes parallel to each other, are connected to each other and to the frame by means of an arbitrarily selectable number (such as four to twenty) coupling wires, for example, by welding. The resonators and transducers can, before and during the welding, be positioned with respect to the frame by means of gauging or positioning elements affixed to the frame, by means of guide grooves or notches in the frame, or by gauging elements of a machine which also positions the frame. The coupling wires on the top and bottom side of the filter arrangement can be constituted by a coil-like continuous winding mounted on the frame or by a plurality of individual wires applied simultaneously on both sides of the frame, the number of these wires being equal to the number of coupling wires with which the filter components are connected to each other and to the frame.

If the frame has the positioning notches, it is advantageous to make the frame of a deformable and stretchable material, preferably metal, so that, by appropriately changing the configuration of the frame after the welding step, the resonators and transducers are taken out of the notches, thereby preventing physical contact between the resonators and transducers on the one hand and the frame on the other. This change of configuration can be accomplished by stretching the frame sections parallel to the resonators and transducers, thereby moving the end faces of the resonators and transducers out of contact with the frame, and then bending the frame sections which extend at right angles to the axes of the resonators and transducers so as to lift the filter components out of the plane of the frame and thence out of the notches, thereby preventing contact between the outer wall surfaces of the resonators and transducers and the frame.

Alternatively, the frame can be made of a non-conductive material, such as ceramic, in which case the frame sections which are parallel to the axes of the resonators and transducers and to which the coupling wires are to be attached, are provided with a weldable metallic coating. Such a frame, which is particularly advantageous when the filter arrangement is made on a machine carrying gauging or guiding elements for purposes of positioning the resonators and transducers, will be further metallized at a plurality of places, mutually insulated from each other, to which the lead-in wires for the transducers are connected, the latter being preferably of the electrostrictive type. In practice, there will preferably be two metallized coatings on opposite longitudinal frame sections so that electric paths through the ceramic of which the frame is made will pass from the connections of the transducer leads to the metallized and grounded transverse sections of the frame, thereby effectively preventing an electrical coupling of the two transducer connections to the frame and hence to each other.

The thickness of the frame can be equal to that of the resonators, or that of the thickest resonator, or be smaller or larger than such thickness. Furthermore, the longitudinal and transverse sections of the frame can be of different thicknesses, the longitudinal sections being preferably somewhat thicker and the transverse sections being somewhat thinner than the resonators.

In practice, it is expedient to provide two additional resonators between the electromechanical transducers and the frame, the resonant frequency of which additional resonators is above and/or below that of the pass band of the filter, thereby mechanically de-coupling the frame from the other elements of the filter arrangement.

In order to protect the filter against outside influences, the entire structure can be covered, on both sides, by plastic or metallic sheets.

Additional objects and advantages of the present invention will become apparent upon consideration of the following description when taken in conjunction with the accompanying drawings in which.

Figure 1:
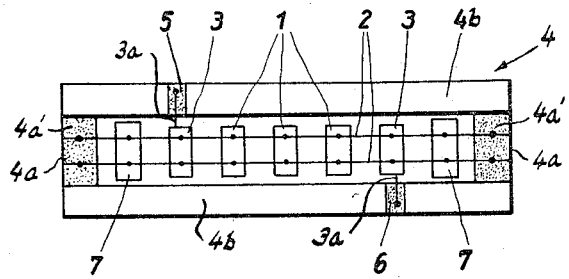
FIGURE 1 is a plan view of one embodiment of a filter arrangement according to the present invention.
Figure 2:
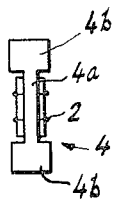
FIGURE 2 is an end view of the structure shown in FIGURE 1.
Figure 3:
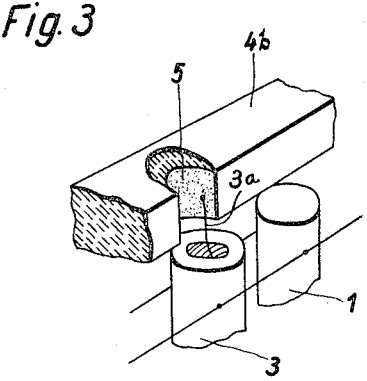
FIGURE 3 is a perspective view showing a detail.

Referring now to the drawings and FIGURES 1, 2, and 3 thereof in particular, the same show a plurality of cylindrical resonator elements 1 and electromechanical transducer elements 3, these elements being arranged with their axes substantially parallel to each other and being of a length equal to a half wave length or a multiple thereof at the mean frequency of the pass band, i.e., a wave length equal to $n\lambda/2$, where $\lambda$ is the wave length and $n$ an integer. The elements 1, 3, are connected to each other by coupling means susceptible to be excited for oscillation in bending or longitudinal modes, such as by wires 2 which are welded to the elements 1, 3, to form a ladder-like filter system the ends of whose oscillatory elements 1, 3, are free swinging. While but three resonator elements 1 are shown as interposed between the transducer elements 3, there may, in practice, be substantially more, as, for example twenty such elements.

The filter system is surrounded by a frame indicated generally at 4, this frame having transverse sections 4a which extend parallel to the axes of the elements 1, 3, and longitudinal sections 4b which extend at right angles thereto. The frame 4 is made of ceramic, the transverse sections 4a being covered by a metallic coating 4a' to which the wires 2 are welded. The lead-ins 3a to the transducers 3 are secured to additional metallic coatings 5 and 6 on the two longitudinal sections 4b, respectively, these coatings 5 and 6 being insulated from each other as well as from the coatings 4a'.

Also shown are two resonator elements 7 interposed between the transducers 3 and the transverse frame sections 4a. The resonant frequency of these additional resonator elements 7 is different from, i.e., either above or below, the pass band frequency of the filter system 1, 3, thereby mechanically decoupling the remainder of the filter system from the frame 4.

As shown in FIGURE 2, the longitudinal frame sections 4b are thicker than the diameter of the thickest of the resonator elements while the transverse sections 4a carrying the metallized coating for mounting the wires 2 are thinner than the diameter of the nearest element (resonator or transducer).

FIGURE 3 shows the physical positioning of a lead-in wire 3a connecting a tubular transducer element 3 to the metallized coating 5 on the longitudinal frame section 4b. In practice, it is expedient to provide the face of the frame 4 with a recessed surface portion, it being at this recessed surface portion that the metallized coating 5 is applied and continued about the edge to the lateral surface. As a result of this recessed attachment of the lead-in 3a, it is possible to stack individual filter arrangements upon each other.

A filter arrangement as described above, can be made in such a manner that the elements 1, 3, prior and during their being welded to the wires 2, are positioned by means of gauging parts which are either carried by the frame, or by the welding machine which also carries the frame. The wires 2 may be positioned with respect to the frame either by means of grooves in the frame, or by guide elements carried by the welding machine carrying the frame.

The present invention further includes a filter arrangement which may be made by using grooves or notches in the frame itself for positioning the elements 1, 3, 7. Such a filter arrangement is illustrated, prior to its final stage, in FIGURE 4, which shows the frame 40 as being provided, in its longitudinal sections 40b, with notches 41 which receive the free ends of the elements 1, 3. These notches serve to position the elements 1, 3, during the time when the wiring 20 is welded thereto. After the welding operation has been completed, the configuration of the frame 40 is changed such that the ends of the elements 1, 3, are out of the notches and thus free to swing. This change of configuration can be accomplished by first stretching the transverse sections 40a, thereby taking the end faces of the elements 1, 3, out of contact with the frame, and thereafter bending the longitudinal sections 40b out of the plane of the frame, so that the filter arrangement will have the final configuration shown in FIGURE 5.

Figure 4:
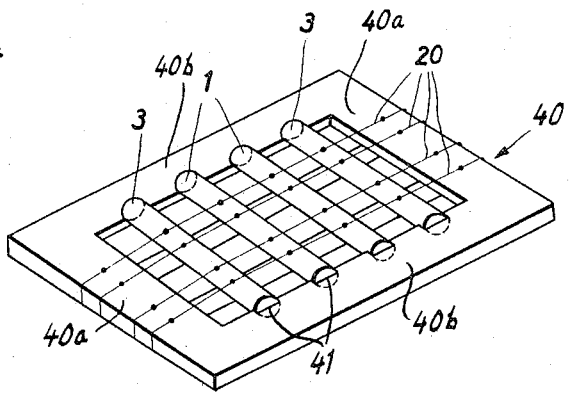
FIGURE 4 is a perspective view showing another embodiment of a filter arrangement according to the instant invention, the component parts being illustrated in an intermediate stage of manufacture.
Figure 5:
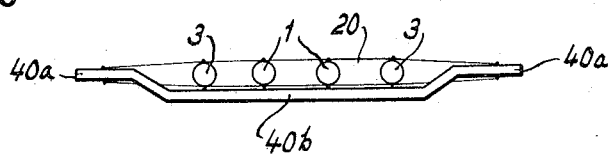
FIGURE 5 is a side view showing the position of the parts after the manufacture thereof has been completed.

The embodiment of FIGURES 4 and 5 also differs from that described above in that the coupling wiring 20 is constituted not by a plurality of individual wires arranged on each side of the frame but by a continuous wire which is coiled about the frame and is attached to both sides thereof.

Figure 6:
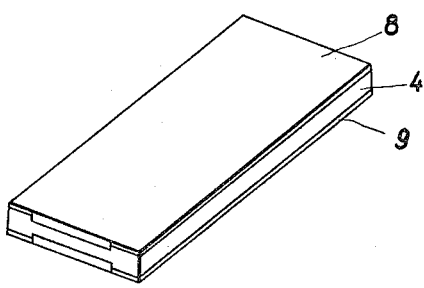
FIGURE 6 is a perspective view of a filter arrangement according to FIGURES 1 and 2, and provided with cover sheets.

FIGURE 6 shows a filter arrangement of the type depicted in FIGURES 1 and 2, the frame 4 being provided with cover sheets 8 and 9 arranged on both sides of the frame. These sheets, which are made either of metal or plastic, are glued, welded or otherwise firmly secured to the frame 4 and form therewith an airtight and fluid-tight housing.

It will be seen from the above that, thanks to the present invention, the wiring serves the double purpose of being both the coupling means which, together with the resonators, form the filter system, and the holding means that suspend the filter system whose individual transducer and resonator elements are thus wholly out of contact with the frame and are freely suspended therein.

It will be understood that the above description of the present invention is susceptible to various modifications, changes, and adaptations, and the same are intended to be comprehended within the meaning and range of equivalents of the appended claims.

What is claimed is:
1. A mechanical filter arrangement comprising, in combination:
 (a) a frame;
 (b) a plurality of electromechanical transducer and resonator elements arranged spaced apart from each other and with their axes substantially parallel to each other, and having a length of $n\lambda/2$, where $\lambda$ is the wave length and $n$ is an integer, said elements disposed in said frame;
 (c) wire means susceptible to be excited for oscillation in bending or longitudinal modes and secured to said elements for coupling the same to each other to form a filter system the ends of whose elements are free swinging, said wire means further being secured to said frame and constituting a means for holding said elements in said frame thereby to form a suspended filter system fhose transducer and resonator elements are wholly out of contact with said frame and are freely suspended in said frame; and
 (d) means interposed between the first and the last of said plurality of elements and said frame for decoupling said suspended filter system from said frame, said decoupling means comprising additional resonator elements having a resonant frequency different from the pass band frequency of said filter system.

2. A mechanical filter arrangement as defined in claim 1 wherein said wire means are constituted by a continuous wire which is coiled about said frame and is attached to both sides thereof.

3. A mechanical filter arrangement as defined in claim 1 wherein said wire means are constituted by a plurality of wires arranged on each side of said frame.

4. A mechanical filter arrangement as defined in claim 1 wherein said frame is made of a deformable and stretchable material.

5. A mechanical filter arrangement as defined in claim 4 wherein said material is metal.

6. A mechanical filter arrangement as defined in claim 1 wherein said frame is made of a non-conductive material, wherein said wire means are secured to transverse sections of the frame which are parallel to the axes of said elements, and wherein said transverse sections are provided with a metallic coating.

7. A mechanical filter arrangement as defined in claim 6 wherein said frame is made of ceramic.

8. A mechanical filter arrangement as defined in claim 6 wherein said frame is provided with a plurality of additional metallic coatings to which electrical leads to said transducer elements are connected, said additional metallic coatings being insulated from each other and from said metallic coatings on said transverse sections.

9. A mechanical filter arrangement as defined in claim 8 wherein said additional metallic coatings are arranged on opposite longitudinal sections of said frame.

10. A mechanical filter arrangement as defined in claim 8 wherein said frame has recessed surface portions, said additional metallic coatings being at said recessed surface portions, thereby permitting individual filter arrangements to be stacked upon each other.

11. A mechanical filter arrangement as defined in claim 1, further comprising cover sheets arranged on both sides of said frame.

12. A mechanical filter arrangement as defined in claim 11 wherein said sheets are made of plastic.

13. A mechanical filter arrangement as defined in claim 11 wherein said sheets are made of metal.

14. A mechanical filter arrangement as defined in claim 1 wherein each of said first and last elements is a transducer element.

15. A mechanical filter arrangement as defined in claim 1 wherein said frame is generally rectangular and said wire means are connected to the transverse sections of said frame.

16. A mechanical filter arrangement as defined in claim 15 wherein the transverse and longitudinal sections of said frame are generally co-planar with each other.

17. A mechanical filter arrangement as defined in claim 15 wherein the transverse sections of said frame lie in one plane and the longitudinal sections of said frame lie outside of said plane.

References Cited by the Examiner

UNITED STATES PATENTS

| | | | |
|---|---|---|---|
| 2,652,543 | 9/1953 | Anthony | 333—71 |
| 2,799,832 | 7/1957 | Niederman | 333—72 |
| 2,859,416 | 11/1958 | Niederman | 333—72 |
| 2,905,909 | 9/1959 | Niederman | 333—72 |
| 2,994,047 | 7/1961 | Borner | 333—72 |
| 3,013,228 | 12/1961 | Kettel | 333—71 |
| 3,238,476 | 3/1966 | Borner | 333—72 |

OTHER REFERENCES

RCA Review, September 1949, pp. 348–65.

HERMAN KARL SAALBACH, *Primary Examiner.*

C. BARAFF, *Assistant Examiner.*